UNITED STATES PATENT OFFICE.

HENRY MATHEY, OF NEW YORK, N. Y., ASSIGNOR TO JOSE F. NAVARRO, OF SAME PLACE.

MANUFACTURE OF HYDRAULIC CEMENT.

SPECIFICATION forming part of Letters Patent No. 343,184, dated June 8, 1886.

Application filed March 27, 1886. Serial No. 196,845. (No specimens.)

*To all whom it may concern:*

Be it known that I, HENRY MATHEY, a citizen of the United States, residing at New York, in the county of New York, State of New York, have invented certain new and useful Improvements in the Manufacture of Hydraulic Cement, of which the following is a specification.

My invention relates to the manufacture of cement from argillaceous limestone. Heretofore in the treatment of such stone in revolving kilns—such as granted me in Letters Patent No. 325,259, September 1, 1885, and No. 339,673, April 13, 1886—it has been found that by reason of deficiency in alumina and iron the resultant cement was of an inferior quality. Again, when such stone is burned with no excess of oxygen, the cement is naturally of light color. I find, also, that the addition of alumina and iron in the form of clay to the stone yields a better stone than when the natural rock alone is used. Therefore, in the process now to be described, I will burn the stone, properly mixed with clay, with a diminished amount of oxygen or with just enough oxygen to promote combustion; second, after burning I will add a metallic oxide, separately burned, to the stone and clay; third, finally pulverize these materials together.

I first take the natural-cement rock and crush it to a suitable degree of fineness. To this I add crushed clay before burning. I then feed this material into a revolving furnace, such as granted to me in Letters Patent No. 325,259 of September 1, 1885. Next, I take a metallic ore—such as iron ore—and roast it in a reverberatory furnace (or other suitable apparatus) for the transformation of the iron into an oxide, as set forth in an application filed of even date with this. This is allowed to cool gradually, and protected from the air during the cooling process. This oxide is then added to the mixture of clay and stone as above mentioned, and these elements—stone, clay, and oxide of iron—are all ground together. The elements are thus thoroughly mixed together.

The proportions of clay and oxide of iron may be varied as circumstances require.

Having thus described my invention, what I claim as new, and desire to secure by Letters Patent, is—

The process of manufacturing cement, which consists in first crushing the natural-cement stone to a suitable degree of fineness, then thoroughly mixing crushed clay with the stone and burning these elements together in a state of agitation and dissemination, next adding, after burning, a pulverized metallic ore roasted separately to form an oxide, and finally pulverizing the stone, clay, and oxide together.

In testimony whereof I affix my signature in presence of two witnesses.

HENRY MATHEY.

Witnesses:
JOHN T. ARMS,
W. C. ALVORD.